July 29, 1924.
O. M. POPE
1,503,005
VARIABLE SPEED TRANSMISSION MECHANISM
Filed March 14 1923   2 Sheets-Sheet 1
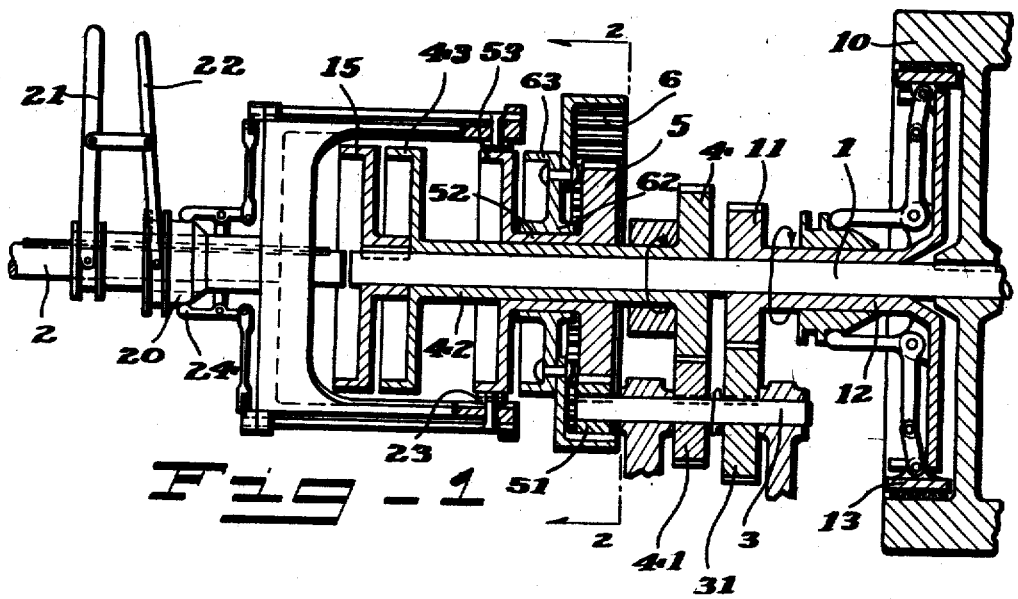
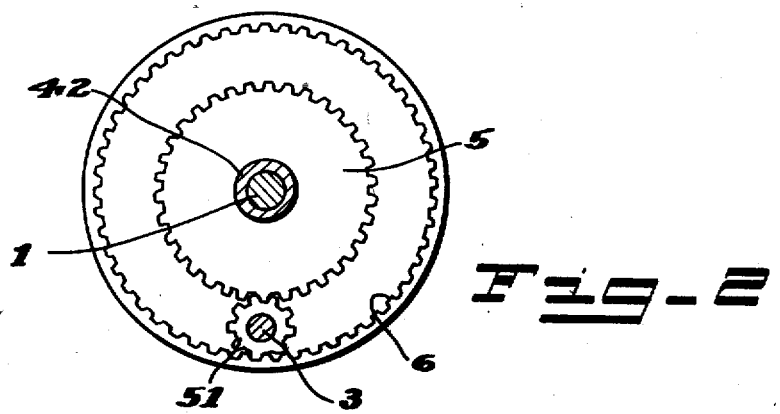
Inventor
Orson M. Pope
By H. L. & G. L. Reynolds
Attorneys July 29, 1924.
O. M. POPE
1,503,005
VARIABLE SPEED TRANSMISSION MECHANISM
Filed March 14, 1923.    2 Sheets-Sheet 2
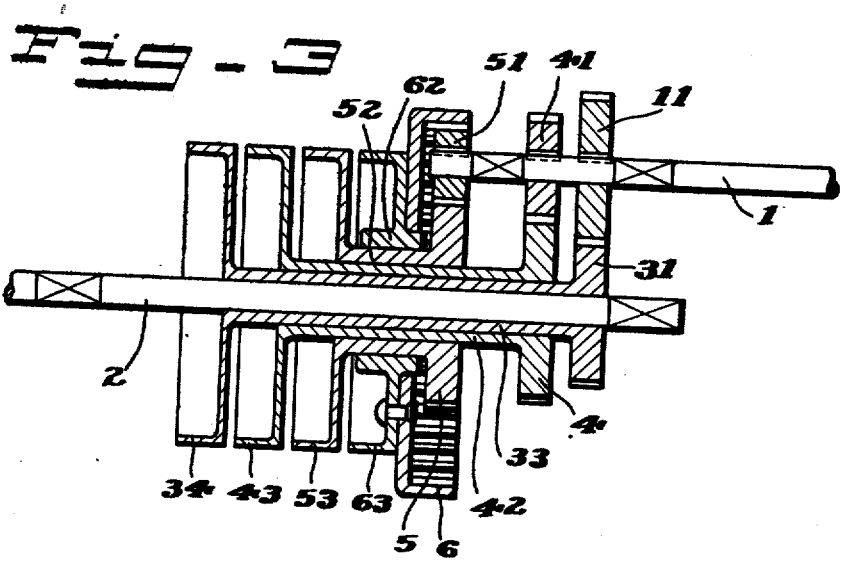
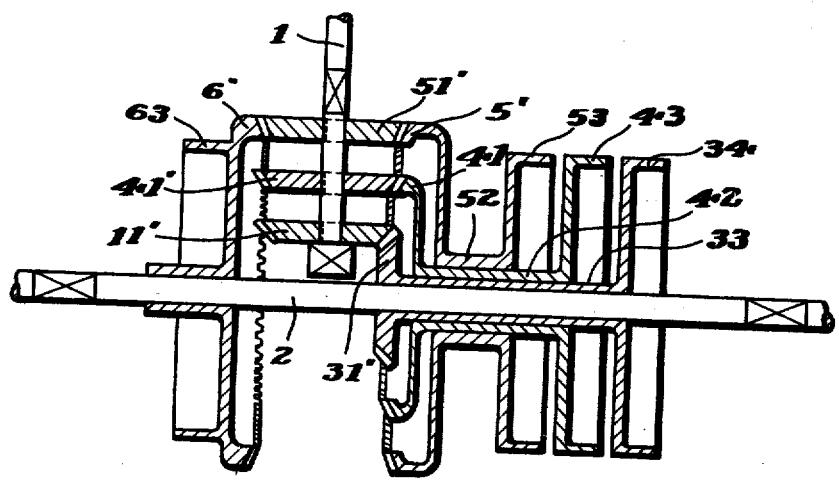
Inventor
Orson M. Pope
By H.L. & G. L. Reynolds
Attorneys Patented July 29, 1924.

1,503,005

UNITED STATES PATENT OFFICE.

ORSON M. POPE, OF SEATTLE, WASHINGTON.

VARIABLE-SPEED TRANSMISSION MECHANISM.

Application filed March 14, 1923. Serial No. 625,104.

*To all whom it may concern:*

Be it known that I, ORSON M. POPE, a citizen of the United States of America, and resident of the city of Seattle, in the county of King and State of Washington, have invented certain new and useful Improvements in Variable-Speed Transmission Mechanisms, of which the following is a specification.

My invention relates to power transmission mechanism and particularly to such mechanism as employs gearing and as generally used for such purposes as communicating the power of an automobile engine to the driving wheels.

It is an object of my invention to provide such geared power transmission mechanism in which the gears are continuously in mesh, and in which the number of gears is cut down to a minimum.

Asscociated with the general object above it is my object to provide means whereby a forward speed gear, as "low," is driven from the same driving pinion as the "reverse" gear.

A further object is the provision of such power transmission gearing, and a selector for use in selecting the gears to be used, so arranged that the standard movement of the gear shift lever applied to the selector will accomplish the same results as in the ordinary or so-called "standard" gear shift now in use. In other words, it is my object to so arrange the selector that by shifting its controlling lever in the manner now employed in shifting a gear shift lever, including the usual neutral position, the same changes of speed will be effected as with the ordinary or "standard" gear shift.

My invention comprises the novel arrangement and combinations of parts which are shown in the accompanying drawings, described in the specification, and particularly defined by the claims terminating the same.

In the accompanying drawings I have shown my invention in the forms which are now preferred by me.

Figure 1 is an axial section through my preferred form.

Figure 2 is a transverse section therethrough on the line 2—2 of Figure 1.

Figure 3 is a modified arrangement, shown diagrammatically, of a form particularly intended for truck drives.

Figure 4 is a further modified arrangement, diagrammatically shown, and particularly intended for tractor drives.

In the form shown in Figure 1 I have illustrated my invention complete. In this form the driving shaft 1 has keyed thereto the usual flywheel 10. A driving gear 11 is formed as a part of a sleeve 12, the latter being connected through a suitable clutch element 13 with the flywheel 10, which forms with the clutch element 13 a clutch for connecting the gear 11 to the driving shaft 1, about which it is journaled. It is obvious, however, that any suitable means for connecting the driving gear 11 to the drive shaft 1 may be employed, that shown herein being merely included for completeness and for purposes of illustration.

In my preferred form I employ a counter shaft 3 upon which is keyed a gear 31 which is in continuous mesh with the driving gear 11. Through the gear 31 the counter shaft 3 is driven whenever the driving gear 11 is clutched to its shaft 1. Upon the counter shaft 3 I secure the pinions 41 and 51 which are of different sizes and adapted to mesh with the gears 4, 5 and 6 which form part of the variable speed power transmission mechanism. The pinion 41 meshes continuously with the driven gear 4, which gear is shown as forming a part of a sleeve 42 journaled about the shaft 1 and carrying a clutch element 43 at the end opposite the gear 4. The gear 4 is the "intermediate" speed gear. The gear 5, which is larger than the gear 4, is formed as part of a sleeve 52 carrying a clutch element 53. This forms the "low" speed gear. The sleeve 52 is journaled about the sleeve 42. The gear 6 is formed as part of a sleeve 62, this having a clutch element 63 and forming the "reverse" gearing.

It will be noted that the pinion 51 is in continuous mesh both with the low-speed gear 5 and the reverse gear 6. So long as the counter shaft 3 is rotating the pinion 51 will drive both the gear 5 and the gear 6, but in opposite directions.

Means are provided which cooperate with the various clutch elements 43, 53, 63 and 15, the latter being keyed directly upon the end of the drive shaft 1, whereby these various clutch elements may be selectively connected with the driven shaft 2. For this purpose I have provided a shifting selector or complemental clutch element 23 which is engageable with any one of the clutch elements 15, 43, 53 or 63. Any suitable means for shifting this clutch element or selector 23 and for securing its engagement with the complemental clutch elements may be employed. I have shown, however, a shifting lever 21, and associated therewith a gripping lever 22. The selector 23 is shifted axially of the shaft 2 by means of the lever 21 and is caused to grip the proper complemental clutch element through the lever 22, the latter controlling a cone 20 which may be moved to force apart levers 24, and through them and their connected link and crank mechanism, as shown in Figure 1, to cause the selector 23 to grip the complemental clutch element about which it is positioned. It is to be understood, however, that the particular design or method of operation of the clutch element 23, and the means for actuating the same form, no part of my present invention, and any suitable means may be employed as the equivalent of that shown.

It will be noted in Figure 1 that the two centrally positioned clutch elements 43 and 53, connected to the intermediate and low-speed gears, are separated by a space the equivalent of one of the clutch elements. It will be noted also that from the right the clutch elements are arranged, in order, as the reverse element 63, low-speed element 53, intermediate 43, and the high-speed element 15. It will be clear, then, that by shifting the lever 21 in the manner now usual with the so-called "standard" gear shift, the selector 23 may be engaged in the same respective order with the clutch elements representing the various speeds, reverse and forward.

The driving pinions 41 and 51 are continuously in mesh with their respective gears 4 and 5 and 6, and the driving gears 11 and 31 are also continuously in mesh. So long as the gear 11 is clutched to the flywheel 10, it is being rotated by the driving shaft 1. During this time, therefore, the driven gears 4, 5, and 6 are being rotated and consequently their associated clutch elements 43, 53 and 63 are being rotated each at a relative speed corresponding to the gear ratio of its connected gear to its driving pinion, and in the direction corresponding thereto. The element 15 is also rotated, being direct-connected to the drive shaft 1. By shifting the selector 23 axially of the driven shaft 2 in the heretofore described manner, it may be clutched to any one of these clutch elements and thus the driven shaft 2 is driven in the desired direction and at the desired speed. If desired the selector 23 may be left in the space between the elements 43 and 53, where it may be held if desired by springs, which are not shown, and thus it will remain in the neutral position. The clutch 13 may be released, to stop rotation of the gears, when the selector 23 is clutched to the clutch element 15, for, as the latter is keyed to the driving shaft 1, and the selector is keyed to the driven shaft 2, a direct drive connection is thereby established between the two shafts, and rotation of the gears is unnecessary.

In Figure 3 the arrangement of Figure 1 has been modified by omitting the counter shaft 3 and by securing the pinions 51 and 41 directly upon the driving shaft 1. Also, for direct connection or high-speed, the pinion 31, which is in mesh with the driving gear 11, has been mounted upon a sleeve 33 which sleeve carries a clutch element 34, this corresponding to the element 15 in the previously described form. In other respects the arrangement is similar to that described and I will therefore omit detailed description thereof, and have omitted from the drawings the selector and the clutch 13.

In the form shown in Figure 4 the driven shaft 2 is placed at right angles to the driving shaft 1. It is therefore necessary to use bevel gears. I have shown the bevel gear 51' as connected between the low speed gear 5' and the reverse gear 6', each of which has connected thereto its clutch element 53 and 63, respectively. Also secured directly upon the drive shaft 1, as in the form of Figure 3, are the driving pinions 41' and 11', these being connected to their respective driven gears, the intermediate 4' and the high-speed gear 31'. The operation of this form is exactly the same as with the form shown in Figure 3. The arrangement, however, is particularly desirable in cases where the drive shaft terminates close to the transverse rear or driving axle of the vehicle, as in tractors.

What I claim as my invention is:

1. In combination with a driving shaft and a driven shaft, power transmission mechanism connecting said shafts including a reverse gear and a forward gear adjacent thereto, a driving pinion in mesh with each of said gears, concentric sleeves surrounding said driving shaft and operatively connected each with one of said gears, and selective means for connecting either said forward or said reverse gear sleeve to the driven shaft.

2. In combination with a driving shaft and a driven shaft, power transmission mechanism connecting said shafts comprising a reverse gear and a plurality of forward gears, the low-speed forward gear being placed adjacent the reverse gear, driving pinions operatively connected to the driving shaft, and continuously in mesh with each of said forward gears, the pinion meshing with the low-speed forward gear meshing also and continuously with the reverse gear, and selective means for connecting any one of said forward gears or said reverse gear with the driven shaft.

3. In combination with a driving shaft and a driven shaft, power transmission mechanism connecting said shafts comprising a gear adapted to be connected to the driving shaft, a countershaft, a gear on said countershaft meshing continuously with said first gear, concentric sleeves surrounding said driving shaft, low- and intermediate-speed gears on their respective sleeves, two pinions upon said countershaft continuously meshing with the low- and intermediate-speed gears, respectively, a reverse gear journaled about said driving shaft adjacent one of said forward gears, the pinion which is in mesh with said latter gear meshing also and continuously with said reverse gear, and means for selectively engaging said reverse gear, said low- or intermediate-speed sleeves, or said driving shaft with the driven shaft.

4. In combination with a driving shaft and a driven shaft, a reverse gear and a plurality of forward gears, driving pinions operatively connected to the driving shaft and continuously in mesh each with its respective gear or gears, a clutch element connected to each of said gears, the clutch elements being disposed closely adjacent in pairs, those connected to intermediate and low gears being spaced by an amount substantially equal to the width of one of said clutch elements, and a complemental clutch element selectively engageable with any one of said first clutch elements, and adapted to come to rest in neutral position out of contact with said first clutch elements in the space between the low and intermediate clutch elements.

5. In combination with a driving shaft and a driven shaft, gears of different ratios and a clutch operable to drive them from said driving shaft, clutch elements connected each with its respective gear, a complemental clutch element fixed upon the driven shaft and engageable selectively with any one of said first-mentioned clutch elements, and a clutch element secured directly upon the driving shaft and engageable by said complemental clutch element to connect said driving and driven shafts directly, and without the interposition of said clutch or gears.

Signed at Seattle, King County, Washington, this 8th day of March 1923.

ORSON M. POPE.